UNITED STATES PATENT OFFICE.

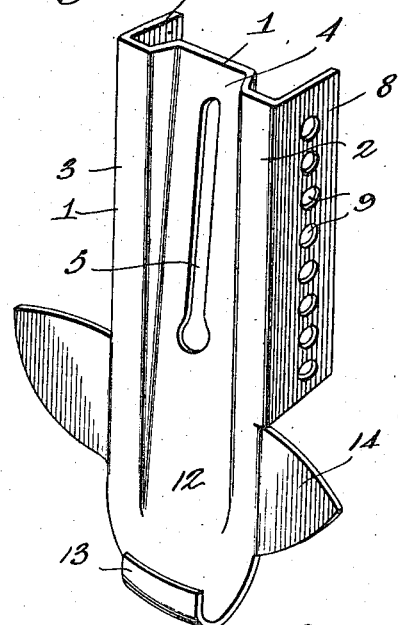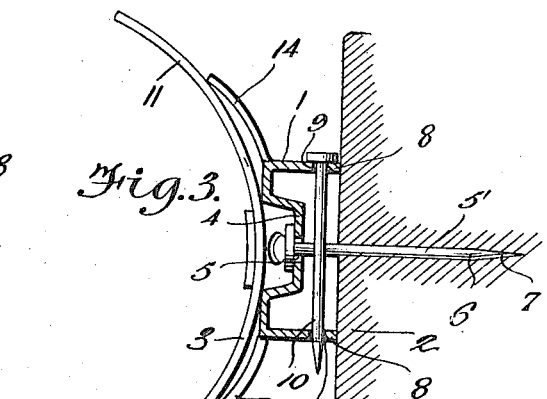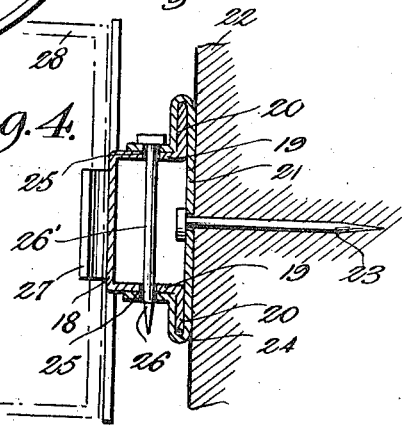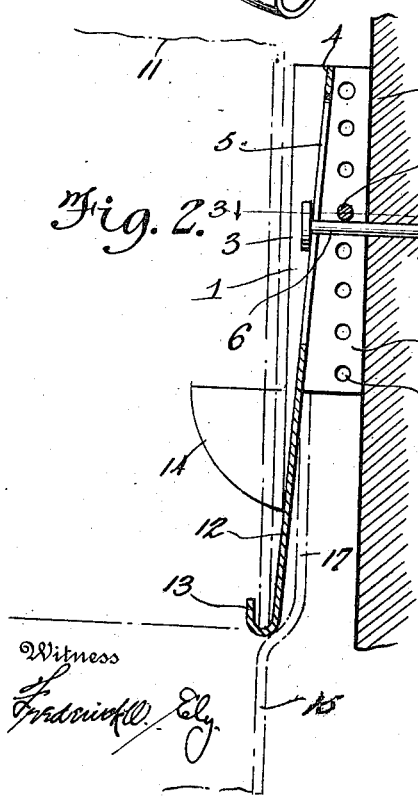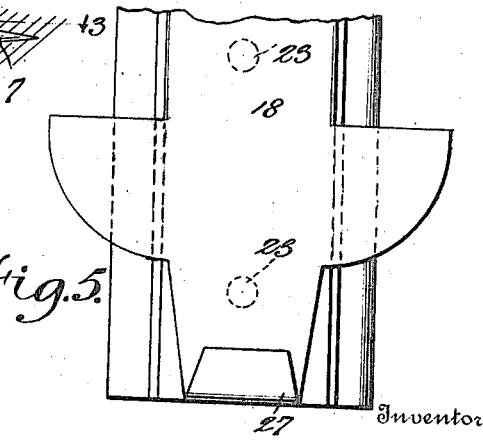

HARRY H. BAKER, OF PHILADELPHIA, PENNSYLVANIA.

BRACKET.

1,260,951. Specification of Letters Patent. Patented Mar. 26, 1918.

Application filed July 18, 1916, Serial No. 109,942. Renewed January 25, 1918. Serial No. 213,819.

*To all whom it may concern:*

Be it known that I, HARRY H. BAKER, a citizen of the United States, residing at Philadelphia, in the county of Philadelphia and State of Pennsylvania, have invented new and useful Improvements in Brackets, of which the following is a specification.

This invention relates to brackets and has particular reference to that type of brackets employed for supporting and securing rain pipes or the like to the sides of buildings or similar supports.

Another object of the invention is to provide a bracket of the above character with means for connecting interfitting pipes without resorting to the use of solder, rivets or similar connecting elements.

Further object is to provide a bracket primarily adapted to secure a rain pipe or water spout to a fixed support, means being provided for attaching the bracket to a fixed support and for adjusting the same to various vertical positions, whereby a pipe supported by the bracket is capable of being adjusted vertically with respect to a coöperating or interfitting pipe member.

A still further object is to provide a bracket of the above character with means for readily and conveniently connecting the same with a pipe or pipes without necessitating the use of attaching permanent securing members to said pipes.

With the above and other objects in view which will appear as the description proceeds, the invention resides in the combination and arrangement of parts and in the details of construction hereinafter described and claimed.

In the accompanying drawings,

Figure 1 is a perspective view of the preferred form of bracket comprising the present invention, Fig. 2 is a vertical sectional view thereof illustrating the application of the device, Fig. 3 is a horizontal sectional view taken on the line 3—3 of Fig. 2, Fig. 4 is a similar view illustrating a slight modification of the bracket, Fig. 5 is a fragmentary front elevation of the modified form of bracket.

Similar characters of reference denote corresponding parts in all the views of the drawing.

The bracket shown in Figs. 1 to 3 preferably consists of a stamped sheet metal structure 1, which is adapted to be connected with the side of a building 2 in a manner to be presently disclosed. The structure 1 is provided with a front portion 3 having an inclined depressed wall 4 formed therein. A slot 5 is provided in the wall 4 for the reception of a securing element 5' of any suitable type, said element being provided with a shank 6 extending through the slot and a sharpened extremity 7, adapted to penetrate the wall or support 2. Inwardly bent side flanges 8 are integrally formed with the front portion 3 of the bracket and extend into contact or engagement with the wall 2. Spaced, horizontally alining openings 9 are formed in said side flanges in order to receive a horizontally disposed cross rod 10, which passes through the openings 9, in a manner illustrated in Figs. 2 and 3, and rests upon a securing element 5', whereby the entire weight of the bracket 1 is directly imposed upon the securing element 5'. By positioning the cross rod 10 in other openings 9 the vertical position of the bracket 1 may be adjusted to suit the requirements of a pipe or duct 11 which is supported by the bracket 1.

The lower extremity 12 of the front portion 3 is provided with an integral upwardly extending projection or lip 13, which is designed to engage with the lower edge of the pipe 13 so that the latter will be supported by the bracket 1. Wings 14 are also formed on the bracket 1, at a point immediately beneath the side flanges 8, said wings being adapted to surround and embrace certain portions of the pipe 13 so that the latter will be more effectively supported by said bracket.

A lower pipe or duct 15 is provided with an enlarged upper extremity 17, which is adapted to surround the lower portion 12 of the bracket 1 and envelop the lower extremity of the pipe 11. The upper edge of the pipe 15 is adapted to abut with the lower portion of the side flanges 8 whereby the upward movement of the pipe 15 is stopped in a regulated manner. The lower portions (not shown) of the pipe 15 is supported in a similar manner as the lower extremity of the pipe 11, as will be obvious. The adjustment afforded by the openings 9 and coöperating cross rods 10 permit the pipes 11 and 15 to be adjusted vertically, whereby the length of said pipes can be conveniently regulated, this feature cannot be accomplished by the present method of connecting rain pipes. It will also be noted that the bracket 1 eliminates the necessity of soldering the coöperating joints or meeting portions of the pipes 11 and 15, thus imparting a degree of flexibleness to the connected pipes which cannot be obtained by a relatively solid connection obtained by the use of solder or the like.

In Figs. 4 and 5 there has been illustrated a slightly modified method of constructing the present invention. In this instance a bracket 18 is provided with inwardly extending side flanges 19, which terminate in outwardly extending projections 20. A fixed plate 21 is secured to a side wall 22 by means of securing elements 23, said plate 21 being provided with grooves or slots 24 designed to receive the projections 20 of the side flanges 19. Alining openings 25 are formed in the side flanges 19 and in side flanges 26 formed on the plate 21, said openings being identical in purpose as the openings 9 in the bracket 1. A cross rod 26 passes through the openings 25 so that the bracket 18 will be secured to the plate 20, said rod being adapted to be inserted in all of the vertically positioned openings 25 so that the bracket 18 while not only being supported by the plate 20 is also capable of being adjusted vertically with respect thereto. A lip 27 is formed on the lower extremity of the bracket 18 and is designed to engage with the under edge portion of a pipe or duct 28, so that the latter will be supported by the bracket 18 and movable with respect thereto. While the pipe 28 has been illustrated to be rectilinear in cross section, it is to be understood that this construction is optional as the brackets 1 and 18 may be employed to support all designs of pipes, whether they are square, circular, corrugated or otherwise formed.

In view of the foregoing description it will be observed that all of the objects of the present invention have been achieved and that all the advantageous features above mentioned are, among others, present; moreover, it is to be understood that various changes and alterations may be made in the precise embodiment of the invention herein disclosed, without departing from the scope and spirit of the invention.

I claim:—

1. A bracket for supporting sectional pipes comprising in combination with a support, means for connecting the bracket to the support, means traversing the bracket for supporting the same in various adjusted positions, a lip formed on the lower end of said bracket for engaging with the lower ends of the pipe sections.

2. A bracket for supporting pipes, comprising in combination with a support, means for securing the bracket to the support, said bracket being provided with spaced horizontally alined openings, means passing through the openings for effecting a vertical adjustment of the bracket with respect to said support, means formed on the lower edge of said bracket for engaging with the lower edge of certain of the pipes, and means provided on the vertical edges of the bracket for engagement with the exterior surface of said pipes.

3. A bracket for supporting pipes, means formed adjacent to the lower extremity of said bracket for engagement with the lower edge of certain of the pipes, a securing element extending transversely through a slot formed in said bracket, a transversely arranged rod positioned in said bracket and extending at right angles to said securing element and resting thereon, and means for adjusting the rod to various vertical positions on said bracket whereby said bracket is capable of being adjusted vertically with respect to said securing element.

4. A bracket for supporting pipes, a lip or projection formed on the lower extremity of said bracket and adapted to engage with the under edge of certain of the pipes, the lower portion of said bracket being positioned between the walls of the pipes, a securing element or elements positioned in a slot formed in said bracket and extending into a supporting wall and means for vertically adjusting said pipe and bracket with respect to said wall.

In testimony whereof I affix my signature.

HARRY H. BAKER.

Copies of this patent may be obtained for five cents each, by addressing the "Commissioner of Patents, Washington, D. C."